United States Patent [11] 3,619,661

[72] Inventors Luther C. Butler, Jr.
  Garden Grove, Calif.;
  Thomas W. Grasmehr, Costa Mesa, Calif.;
  Robert S. Jamieson
[21] Appl. No. 8,877
[22] Filed Feb. 5, 1970
[45] Patented Nov. 9, 1971
[73] Assignee Lorain Products Corporation
  Lorain, Ohio

[54] MULTICHANNEL CONTROL CIRCUIT
  16 Claims, 4 Drawing Figs.
[52] U.S. Cl................................................. 307/269,
  178/69.5, 307/211, 307/219, 328/63, 328/72,
  331/56
[51] Int. Cl....................................................H03h 17/26
[50] Field of Search......................................... 178/69.5;
  307/204, 211, 219, 269; 328/63, 72; 331/56

[56] References Cited
  UNITED STATES PATENTS
  3,522,455  8/1970  Thomas et al. ................  307/269
  3,411,107 11/1968  Rees.............................  331/56 X
  3,278,852 10/1966  Mann ...........................  307/204 X
  3,297,955  1/1967  Corey et al. ..................  331/56 X
  3,467,956  9/1969  Moreines......................  307/211 X Primary Examiner—Donald D. Forrer
Assistant Examiner—R. C. Woodbridge
Attorney—John Howard Smith ABSTRACT: A control signal generating circuit for producing a plurality of phase-coordinated trains of pulses despite any single failure in the control signal generating circuitry. A plurality of control signals are generated by respective channels of signal generating circuitry in accordance with timing signals from respective timing signal generating circuits. Delay circuitry within each timing signal generating circuit prevents any one of such generating circuits from producing a timing signal until a majority of the timing signal generating circuits are ready to produce their respective timing signals, at which time simultaneous timing signals are caused to appear at the outputs of all timing signal generating circuits. Synchronizing circuitry within each timing signal generating circuit causes the latter to assume an operative state in conformity with the operative states of the majority of the timing signal generating circuits, this conforming activity occurring simultaneously in all timing signal generating circuits when the latter produce their respective timing signals. A plurality of signal generators each adapted to produce a plurality of respective outputs normally operate under the control of respective timing signal generating circuits but such control can be overridden to cause each signal generator to assume an operative state in conformity with the operative state of a majority of the signal generators. A plurality of mixing circuits combine corresponding outputs from the different signal generators and provide a plurality of control signals at a plurality of respective output terminals as long as a majority of the outputs of each type from the signal generators are in phase.

INVENTOR.
THOMAS W. GRASMEHR
LUTHER C. BUTLER, JR.
ROBERT S. JAMIESON
BY John Howard Smith

MULTICHANNEL CONTROL CIRCUIT

BACKGROUND OF THE INVENTION

The present invention relates to control circuits for gate controlled switching devices such as thyristors and is directed more particularly to a control circuit adapted to produce the desired control signals despite the failure of any single component within the control circuitry.

In those inverter circuits which utilize thyristors, it has been the practice to provide control signals to each thyristor, as required, from a control signal generating circuit. Since the failure of any component in an ordinary control signal generating circuit is likely to terminate the control signals produced thereby, circuitry of this type is unsuitable for use in conjunction with inverter circuits which supply AC power to computers during commercial power failures. An inverter circuit suitable for such use is disclosed in the copending application of Lee O. Mesenhimer and Thomas W. Grasmehr, now U.S. Pat. No. 3,500,166 entitled Integrated Three Phase Inverter System. This is because the failure of the control circuit to properly control inverter operation can result not only in damage to computer circuitry but also in an interruption in the flow of vital information from a computer which is operating on a real time basis. It is apparent, therefore, that an important consideration in the provision of control signal generating circuitry is that the latter circuit of highly reliable, that is, that the supply of control signals continue despite the failure of any single control circuit component.

In the past, attempts to produce a highly reliable inverter control circuit have involved the provision of a plurality of control signal generating circuits, any one of which was capable of providing the required control signals. In the event of a failure in one circuit, the remaining, nonfailed circuit or circuits provided the required control signals, the operation of the failed circuit being suppressed. Circuits of this type are subject to several difficulties.

A first difficulty is that circuitry must be provided which will keep the control signals generated by the different control signal generating circuits substantially in synchronism. This is necessary to assure a smooth transition between the operation of different pulse generating circuits in the event of the failure of any one pulse generating circuit. Additionally, this synchronizing circuitry must operate in a manner such that a failed pulse generating circuit does not interfere with the nonfailed circuits through the synchronizing circuitry. Further, provision must be made for the failure of the of the synchronizing circuitry.

Second, circuitry must be provided for selecting which control signal generating circuit or circuits will be utilized to provide pulses in the event of disagreement therebetween as might occur, for example, as a result of the failure of a portion of one control signal generating circuit. Again this must be accomplished without allowing a failed control signal generating circuit to interfere with the operation of the nonfailed circuit or circuits through the selector circuitry. Additionally, provision must be made for the failure of the selector circuitry.

Third, because the inverter circuits include two or more thyristors each of which requires a control signal which differs in phase from that required by the remaining thyristors, circuitry must be provided to maintain the desired phase relationship between the control signals for different thyristors despite any single circuit failure. This must, of course, be accomplished without allowing a failed circuit or portion thereof to interfere with the operation of the remaining circuits through the phase control circuitry.

SUMMARY OF THE INVENTION

Accordingly, it is an object of the invention to provide improved thyristor control circuitry.

It is another object of the invention to provide an improved thyristor control circuit adapted to produce a plurality of properly phased thyristor control signals despite the failure of any single circuit or portion thereof.

Another object of the invention is to provide a thyristor control circuit including a plurality of first pulse generating circuits, pulses of a first frequency being produced at the output of these pulse generating circuits only after a majority of the unsynchronized oscillator circuits included within respective unsynchronized oscillator circuits included within respective first pulse generating circuits have been energized.

Still another object of the invention is to provide a plurality of first pulse generating circuits of the above character wherein the fact that any unsynchronized oscillator circuit has been energized is stored until a majority of the oscillator circuits have been energized, at which time pulses are produced simultaneously at the outputs of all pulse generating circuits.

It is another object of the invention to provide a plurality of second pulse generating circuits of the same character as the above mentioned first pulse generating circuits, the repetition rate of pulses from each second pulse generating circuit being substantially less than the repetition rate of pulses from each first pulse generating circuit.

Yet another object of the invention is to provide circuitry whereby the appearance of pulses at the outputs of the different pulse generating circuits cause the different unsynchronized oscillator circuits included therein to simultaneously assume a predetermined initial state, thus forcing the pulse generating circuits substantially into synchronism.

It is still another object of the invention to provide circuitry adapted to cause the pulses appearing at the outputs of all pulse generating circuits to have predetermined minimum duration.

Another object of the invention is to provide a control circuit including a plurality of gate signal generating circuits for producing a plurality of respective gating signals of a predetermined phase relationship in accordance with pulses from respective first and second pulse generating circuits.

Still another object of the invention is to provide a control circuit of the above character wherein each gate signal generating circuit compares its operative state with that of the remaining gate signal generating circuits, each such circuit being adapted to change its own state to conform the latter to the states of the remaining circuits.

Yet another object of the invention is to provide a control circuit of the above type which includes circuit means for combining corresponding gating signals of the different gating signal generating circuits, it being necessary that a majority of the gating signals of each type are in phase before a final thyristor firing signal is produced.

More specifically, it is an object of the present invention to provide a multichannel control circuit including the combination of timing signal generating circuit means, timing signal responsive means responsive to said timing signal generating circuit means and signal combining circuit means for affording a highly reliable source of signals of predetermined frequency, duration and phase.

Generally speaking, the invention comprises a plurality of first and second pulse generating circuits disposed in control relationship to respective gate signal generating circuits. Each pulse generating circuit includes an oscillator circuit, a memory circuit and a majority responsive switching circuit. As each oscillator circuit produces an output, the respective memory circuit is energized and, in turn, energize predetermined inputs of each majority responsive switching circuit are energized, pulses are produced simultaneously at the output of each pulse generating circuit.

Each gate signal generating circuit includes a pulse controlled switching circuit and a plurality of gate circuits, responsive thereto, a gate circuit being provided for each thyristor to be controlled. Pulses from the second pulse generating circuits control the states of respective pulse controlled switching circuits. Each pulse controlled switching circuit, in turn, controls the periods during which respective gate circuits pass energizing pulses from the respective first pulse generating circuit to the thyristors to be fired. Each gate signal generating circuit is also provided with a circuit for comparing the state of the respective pulse controlled switching circuit with that of the majority of pulse controlled switching circuits, corrective action being initiated if necessary to insure agreement between the former and the latter.

The outputs of corresponding gates of different gate signal generating circuits are combined in a signal mixing circuit. A thyristor firing signal is produced by the signal mixing circuit only if a majority of the above outputs are in phase with each other.

Since only a majority of the circuits of each type is necessary to maintain the desired output, the failure of any one of each type of circuit does not interrupt the output. An added measure of reliability is, however, imparted by causing the circuitry of each type to actively seek to conform its operative state to that of the majority. In this manner a chain of circuits can be made to continue to produce its output despite the failure of one or more circuits of the chain.

DESCRIPTION OF THE INVENTION

Figure 1:
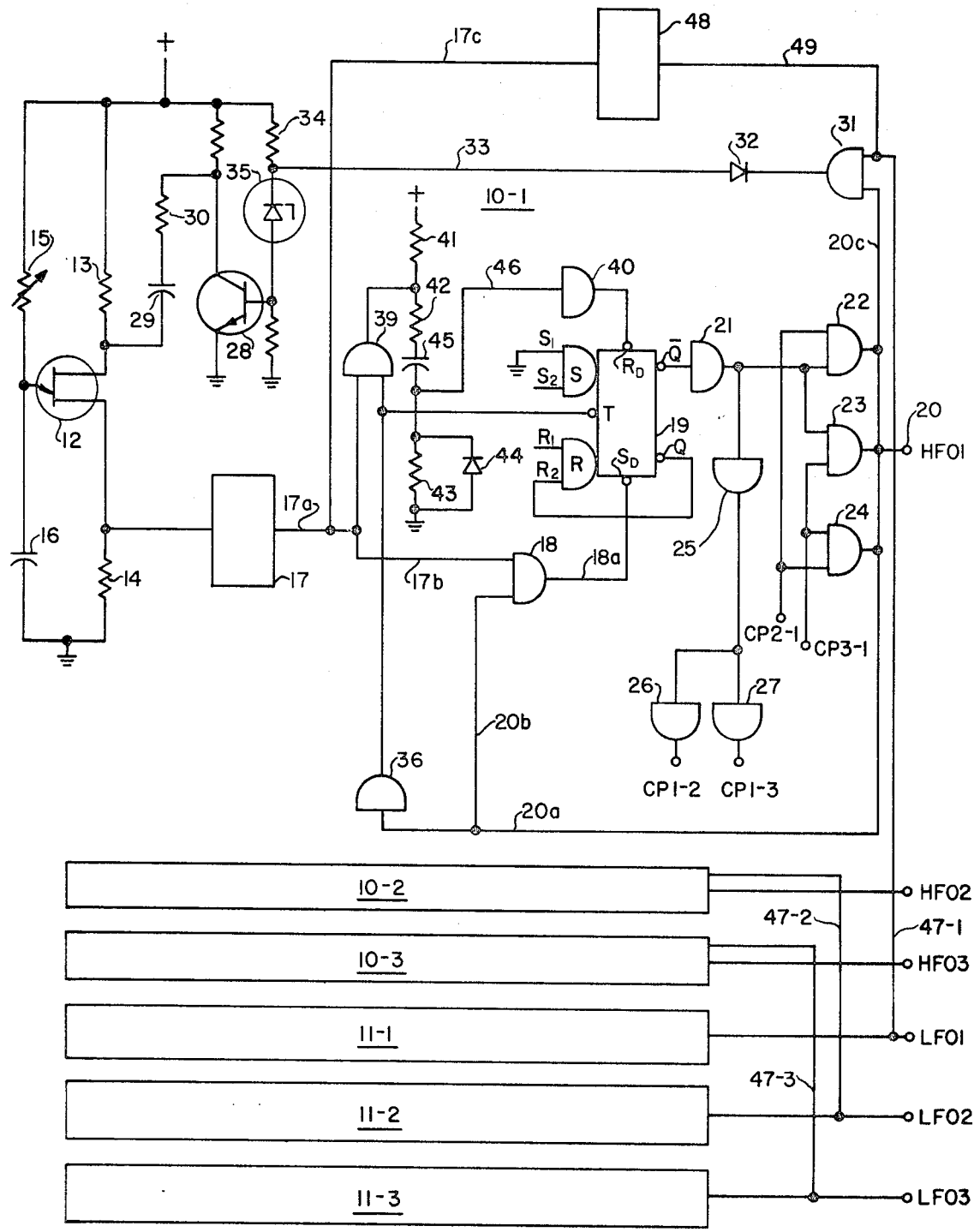
FIG. 1 is a combined logic and schematic diagram of timing signal generating circuit means.

Referring to the upper portion of FIG. 1, there are shown first pulse generating circuits 10-1, 10-2 and 10-3 which serve to provide high frequency output (HFO) signals HFO1, HFO2 and HFO3, respectively. The latter are timing signals comprising trains of substantially rectangular pulses which, through circuitry yet to be described, energize the gates of predetermined thyristors. Because of the similarity between first pulse generating circuits 10-1, 10-2 and 10-3, only the circuitry of first pulse generating circuit 10-1 is shown in detail and remarks made with reference to circuit 10-1 will be understood to apply with equal force to circuits 10-2 and 10-3.

Referring to the lower portion of FIG. 1 there are shown second pulse generating circuits 11-1, 11-2 and 11-3 which serve to provide low-frequency output (LFO) signals LFO1, LFO2 and LFO3, respectively. The latter are timing signals comprising trains of substantially rectangular pulses and determine the thyristors to which the above described HFO signals will be applied. Because the first and second pulse generating circuits differ only in operating frequency, the circuit detail of second pulse generating circuits 11-1, 11-2 and 11-3 has been omitted. It will be understood, however, that remarks made with reference to first pulse generating circuits 10-1, 10-2 and 10-3 apply with equal force to second pulse generating circuits 11-1, 11-2 and 11-3.

Figure 2:
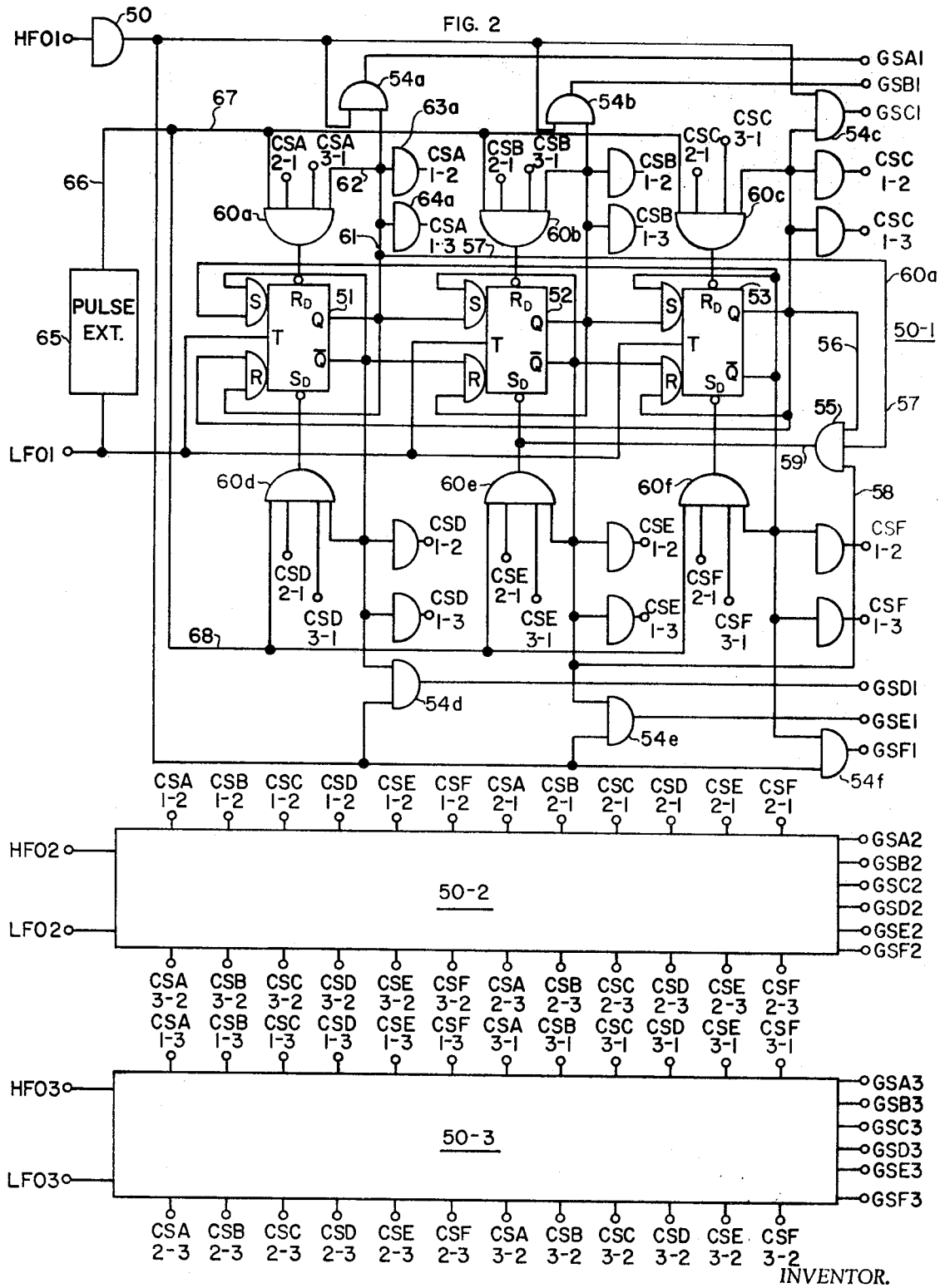
FIG. 2 is a logic diagram of signal generating circuit means responsive to the timing signal generating circuit means of FIG. 1.

Each circuit of FIG. 1 controls those circuits of FIG. 2 which bear the same postscript. Similarly, circuits in FIGS. 1 and 2 which have the same postscript control those circuits of FIG. 3 which bear that postscript. In the following description the term "channel" is utilized to refer to circuits related in the above manner. The circuits of FIGS. 1, 2 and 3 which bear the postscript "−1," for example, comprise a chain of interacting circuits known as the circuits of channel 1. Those signals, such as timing signals HFO1 and LFO1 which are transmitted between circuits of the same channel will be termed intrachannel signals.

In addition to the above-described intrachannel relationships, there exists a plurality of cross- or interchannel relationships between circuits of the same type. This allows a determination as the whether the circuitry of each channel is operating properly, that is, conformity with the corresponding circuits of the other channels. As will be described more fully later, corrective activity can be initiated in any channel if signals from that channel indicate disagreement with signals from the remaining channels.

In the following description double postscripts such as, for example, "1-2" are applied to interchannel signals, the first letter indicating the channel in which the signal is produced and the second letter the channel in which the signal is used. In the first pulse generating circuit of channel 1, for example, interchannel checking pulses (CP) CP1-2 and CP1-3 are produced and sent to the first pulse generating circuits of channels 2 and 3, respectively. Similarly, interchannel checking pulses CP2-1 and 3-1 are produced in the first pulse generating circuits of channels 2 and 3, respectively, and sent to the first pulse generating circuit of channel 1. Showing the conductors required to connect terminals such as that at which appears signal CP1-2 would make FIG. 1 unduly crowded. Accordingly, these conductors have been omitted. It will be understood, however, that the first pulse generating circuit of channel 2 receives signal CP1-2 from channel 1 in the same manner that the first generating circuit of channel 1 receives signal CP1-1 from channel 2.

The circuit of the present embodiment utilizes logic wherein the high state is represented by a positive voltage (usually +5.6 volts) and the low state is represented by ground or 0 volts. Thus, when the signal at a given point is said to be high, it is meant that a positive voltage appears between ground that point. Similarly, when the signal at a given point is said to be low, it is meant that that point is at ground potential.

Figure 4:
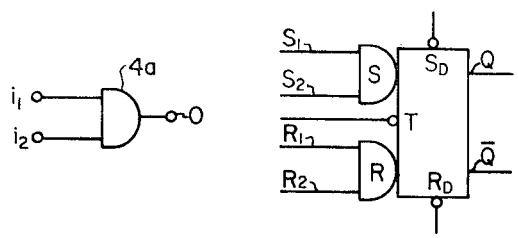
FIG. 4 illustrates circuit elements of the type utilized in FIGS. 1, 2 and 3.

An example of a first type of logic device is the gate 4a of FIG. 4. Gate 4a has first and second inputs $i_1$ and $i_2$ and an output O. The output of this gate is low only if both inputs are high or, alternatively, the output is high if any one or more inputs are low. These statements will be understood to apply to any gate used herein notwithstanding the number of inputs.

An example of a second type of logic device is the flip-flop 4b of FIG. 4. Flip-flop 4b has a pair of clocked set inputs $s_1$ and $s_2$, a pair of clocked reset inputs, $R_1$ and $R_2$, a clock or toggle input T, unclocked inputs $S_D$ (derived from the term "set direct") and $R_D$ (derived from the term "reset direct") and first and second outputs Q and $\overline{Q}$. Q and $\overline{Q}$ are normally in opposite logical states. When flip-flop 4b is operating in its unclocked mode, a low appearing at input $S_D$ will cause output Q to go high thus setting the flip-flop. Similarly, a low appearing at input $R_D$ will cause output $\overline{Q}$ to go high thus resetting the flip-flop. When flip-flop 4b is operating in its clocked mode output Q goes high (the flip-flop is set) when the signals at inputs $S_1$ and $S_2$ are both high at the time that a high-to-low transition occurs in the signal appearing at the toggle input T. Similarly, output Q goes high (the flip-flop is reset) when inputs $R_1$ and $R_2$ are both at the time that a high-to-low transition occurs in the signal appearing at toggle input T.

It sometimes happens that a gate or a flip-flop has more inputs than are actually needed. Under these conditions the unused inputs must be kept high so that the remaining inputs may control the state of the output. In diode-transistor-logic (DTL) circuits of the type contemplated for use herein, this may be accomplished by leaving the unused inputs unconnected. Similarly, if a change in the state of the output of a particular gate or flip-flop is to be prevented from occurring, this may be accomplished by grounding an input.

To the end that pulses may be generated within first pulse generating circuit 10-1 there is provided a unijunction oscillator circuit including unijunction transistor 12, upper and lower base resistors 13 and 14, respectively, and a timing circuit comprising variable resistance 15 and capacitance 16. This oscillator circuit operates in a manner well known to those skilled in the art to provide a series of positive voltage pulses across resistor 14. A waveshaping circuit 17 converts the peaked pulses produced by the unijunction oscillator circuit to rectangular switching pulses of the desired duration. These switching pulses initiate the switching activity which results in the production of an HFO pulse by the respective pulse generating circuit.

To the end that the fact that a switching pulse has appeared at the output of waveshaping circuit 17 may be stored until corresponding pulses are produced in the pulse generating circuit of channel 2 or channel 3, a gate 18 and a memory flip-flop 19 are provided. During the above switching pulse a high is applied to the upper input of gate 18 through conductors 17a and 17b. If, under these conditions, no HFO is being produced in channel 1 (that is, if terminal 20 is high) a high will be applied to the lower input of gate 18 through conductors 20a and 20b. As a result, the output of gate 18 will go low thus causing a low to appear at the $S_D$ input of flip-flop 19 through conductor 18a. This sets flip-flop 19 rendering the $\bar{Q}$ output thereof low. Thus, output $\bar{Q}$ of flip-flop 19 goes low each time a switching pulse occurs before a HFO1 pulse is produced.

In order that the low state of output $\bar{Q}$ of flip-flop 19 may condition pulse generating circuit 10-1 for the generation of an HFO1 pulse there is provided a gate 21 and a majority responsive switching circuit including gates 22, 23 and 24. In order for an HFO1 pulse to occur, that is, in order for the output of gate 22 or 23 or 24 to go low, both inputs to gate 22 must be high or both inputs to gate 23 must be high or both inputs to gate 24 must be high. Since only the lower input of gate 22 and the upper input of gate 23 are made high as a result of $\bar{Q}$ going low, it is apparent that HFO1 pulse cannot be produced when the memory flip-flop of only channel 1 is energized. Thus, flip-flop 19 has only partial control over the majority responsive switching circuit.

The above no-output state will persist until one of two conditions occur. First, interchannel signal CP2-1 may occur (go high) indicating that the memory flip-flop of channel 2 has been energized by a switching pulse. This will cause the output of gate 22 to go low thus initiating an HFO1 pulse. Second, interchannel signal CP3-1 may occur (go high) indicating that the memory flip-flop channel 3 has been energized by a switching pulse. This will cause the output of gate 23 to go low thus initiating an HFO1 pulse.

In addition to occurring when the memory flip-flop in channel 1 is set at the time that the memory flip-flop in channel 2 or channel 3 is set, HFO1 can also occur when the memory flip-flops in channel 2 and channel 3 are set, even if the memory flip-flop channel 1 is not set. This is because the output of gate 24 can go low when interchannel signals CP 2-1 and CP 3-1 are both high, the latter conditions indicating that the memory flip-flops of both channel 2 and channel 3 are set. This is possible because the latter signals are not dependent upon the operativeness of the pulse generating circuit in channel 1.

In view of the foregoing, it is apparent that as soon as the flip-flops of any two channels are set, the majority gate circuit in each channel produces an HFO pulse. This allows HFO signals from all channels to continue despite the failure of the pulse generating circuit of any one channel. This prevents the failure of any pulse generating circuit from disrupting the operation of the remaining circuitry of the same channel. Thus, by minimizing the circuitry rendered inoperative by a single failure, the likelihood that the circuit will survive a second failure is increased thereby enhancing the reliability of the entire control system.

The generation of interchannel checking pulses in channel 1 for use in channels 2 and 3 (namely CP 1-2 and CP 1-3) is accomplished by gates 25, 26 and 27. Gates 26 and 27 serve as means for dividing the signal appearing at the output of gate 25 into two substantially isolated signals. Gate 25 is provided to compensate for the state reversal introduced by gates 26 and 27. Thus, signals CP 1-2 and CP 1-3 which the circuitry of channel 1 supplies to the majority responsive switching circuits of channels 2 and 3 are substantially identical to the signal which the circuitry of channel 1 applies to the majority responsive switching circuit of its own channel. It will be understood that interchannel checking pulses are generated in channels 2 and 3 for use in channel 1 in the same manner that interchannel checking pulses are generated in channel 1 for use in channels 2 and 3.

In view, of the foregoing, it is apparent that the outputs of the unijunction oscillators in channels 1, 2 and 3 need not be simultaneous to produce simultaneous HFO1, HFO2 and HFO3 signals. This is possible because the unijunction oscillator which is first to fire merely provides one of the required two enabling conditions to the majority responsive switching circuit in each channel. After this first enabling condition occurs, the majority responsive switching circuits in each channel wait, as required, for the firing of a second unijunction oscillator. When this occurs, simultaneous HFO signals are produced in all three channels. Thus, the pulse generating circuitry of FIG. 1 produces the desired simultaneous HFO pulses despite a lack of synchronism between the respective unijunction oscillators.

In order that all unijunction oscillator circuits may operate in synchronism after the generation of the above described first set of HFO pulses, circuitry is provided to force the unijunction oscillators of each channel into step at the end of each HFO pulse. In the present embodiment this is accomplished by a synchronizing circuit including a suitable NPN transistor 28. Because the collector of transistor 28 is connected to the upper base of unijunction transistor 12 through a coupling capacitor 29 and a resistor 30, and because the emitter thereof is connected to ground, the conduction of transistor 28 through its collector-emitter circuit causes the potential of the upper base of unijunction transistor 12 to drop toward ground potential. As is well known to those skilled in the art, this decreases the voltage required, between the lower base and the emitter of transistor 12, to fire the latter. As a result, the unijunction oscillator is forced to conduct (and thereby discharge capacitor 16) and remain conducting during the time that transistor 28 conducts. Thus, at the end of the HFO pulse of each channel, when transistors such as transistor 28 return to their nonconducting states, the oscillators in each channel begin their oscillatory activity from the same portion of their respective cycles.

To the end that the above described synchronizing activity may occur at the desired time, the conduction of transistor 28 is initiated by the HFO1 pulse through a gate 31, a diode 32 and a conductor 33. When HFO1 occurs (goes low), the output of gate 31 goes high thereby applying a positive potential to the cathode of diode 32. Because this reverse biases and therefore cuts off the flow of current through diode 32, the voltage drop across a resistor 34 decreases thereby causing the breakdown of zener diode 35 and the conduction of transistor 28. This causes the previously described forced firing of transistor 12. Because HFO2 and HFO3 occur at the same time as HFO1, the same effect is produced simultaneously in channels 2 and 3.

As described previously HFO pulses appear at the outputs of all three channels only after the memory flip-flops of at least two different channels are set. It is apparent, therefore, that all HFO pulses begin when the second of the required two memory flip-flops is set. Since the switching time of flip-flops and gates are small, this occurs at substantially the same time as does the switching pulse which initiates the setting of the second flip-flop. Thus, HFO pulses begin at substantially the same time as the second occurring switching pulses.

The HFO pulses, once begun, continue as long as at least two inputs to each majority responsive switching circuit remain high. This condition will persist as long as two of the memory flip-flops remain set. It will be seen, therefore, that once begun, HFO pulses end only when at least two of the memory flip-flops are caused to reset. In the present embodiment, this resetting is accomplished at end of selected one of the switching pulses from waveshaping circuits such as waveshaping circuit 17. The selected switching pulse is that one which will assure that the desired HFO pulses have a predetermined minimum duration.

The selection of a suitable switching pulse must take into account the four different types of phase or time relationships which may exist between the switching pulses of the different channels. A first type is that wherein the second occurring switching pulse occurs at substantially the same time as the first occurring pulse. A second type is that wherein the second occurring pulse occurs near the end of the first occurring pulse. A third type is that wherein the second occurring pulse follows the end of the first occurring pulse. A fourth type is that wherein all three switching pulses occur simultaneously.

To the end that pulse HFO1 may have a predetermined minimum duration regardless of which of the above described types of phase relationships exist, there is provided a narrow pulse rejection circuit including first and second switch means 39 and 40, which here take the form of suitable gate circuits, and timing circuit means which in the present instance includes resistors 41, and 42 and 43, diode 44 and capacitor 45. This circuit will allow the end of the switching pulse of channel 1 to terminate the HFO pulses of all channels unless termination at such time will result in undesirably short pulses. In the latter event the end of a latter occurring switching pulse from another channel is caused to terminate all HFO pulses.

Assuming that a phase relationship of the first type exists, the two simultaneously high switching pulses will simultaneously set their respective memory flip-flops. Under these conditions, when HFO1 occurs, the output of gate 36 will go high thereby enabling one input of gate 39. Since the switching pulse of channel 1 has previously rendered high the other input to gate 39, it is apparent that the output of gate 39 goes low at the beginning of the HFO1 pulse. Thus, the output of gate 39 is low during the period after the beginning of HFO1 and before the end of the switching pulse of channel 1.

During the period when the output of gate 39 is high, capacitor 45 is charged positive on the top by a current from the positive supply to ground resistors 41, 42 and 43. During the period when the output of gate 39 is low the charge present upon capacitor 45 discharges through the circuit including ground, diode 44 resistor 42 and the low output of gate 39, the latter point being at ground potential.

If the period during which the output of gate 39 is low is sufficiently long to allow the discharge of capacitor 45 to run substantially to completion, a substantial inrush charging current will flow in capacitor 45 through resistor 41, 42 and 43 when the output of gate 39 goes high at the end of the switching pulse. This substantial inrush current is arranged to produce a voltage drop across resistor 43 sufficient to render high the input of gate 40 through conductor 46. If these conditions exist, the output of gate 40 will go low at the end of the switching pulse. As a result, flip-flop 19 will be reset via it's $R_D$ input to terminate HFO1 at the end of the switching pulse.

If, however, the duration of the above period is insufficiently long for capacitor 45 to discharge fully, a smaller inrush charging current will flow in capacitor when the output of gate 39 goes high at the end of the switching pulse. This smaller inrush current is arranged to produce a voltage drop across resistor 43 insufficient to render high the input of gate 40 through conductor 46. If these conditions exist, the output of gate 40 will remain high and, therefore, neither reset flip-flop 19 nor terminate HFO1 at the end of the switching pulse.

In view of the foregoing, it is apparent that the above described narrow pulse rejection circuit will allow gates 39 and 40 to terminate HFO1 at the end of the switching pulse of channel 1 only if capacitor 45 has sufficient time to substantially discharge during HFO1. The rate of discharge of capacitor 45 is predetermined so that this cannot occur unless the duration of the HFO1 pulse exceeds the desired predetermined minimum. Since this minimum time is exceeded in both channels, under the assumed first type of phase relationship, whichever switching pulse ends first will terminate all HFO pulses.

Assuming that a phase relationship of the second type exists, the beginning of the second occurring switching pulse occurs shortly before the end of the first occurring switching pulse. Under these conditions the flip-flop which is set by the first switching pulse will not reset at the end of the first occurring switching pulse. This is because there is insufficient time between the beginning of the HFO pulse in that channel and the end of the switching pulse of that channel for a capacitor such as capacitor 45 to discharge fully. As a result, there cannot flow the inrush current required to produce a high at the input of gate 40. Thus, HFO pulses will continue despite the end of the first occurring switching pulse if a phase relationship of the second type exists.

The termination of the HFO pulses at the end of the second occurring switching pulse is not restricted in the manner described above. This is because the HFO pulse in the channel producing the second occurring switching pulse begins at the same time as the second switching pulse and continues after the end of the first switching pulse. Consequently, the capacitor 45 can discharge during the entire second switching pulse. As a result, the inrush current which flows in capacitor 45 at the end of the second switching pulse is sufficient to produce a high at the input of gate 40. Thus, HFO pulses are terminated at the end of the second occurring switching pulse if a pulse relationship of the second type exists.

Assuming that a phase relationship of the third type exists, the second occurring switching pulse begins after the end of the first occurring switching pulse. Under these conditions, HFO pulses do not occur until after the end of the first occurring switching pulse. Accordingly, there is no time when the first switching pulse is high at the same time that HFO pulses are being produced. As a result, the two inputs of gate 39 never go high at the same time. Thus, the output of gate 39 remains high preventing the discharge of capacitor 45, this discharge being required to reset flip-flop 19 via is $R_D$ input.

Later, when the second occurring switching pulse occurs, an HFO pulse is produced. Under these conditions, the output of gate 39 goes low to discharge capacitor 45 during substantially the entire second switching pulse. Thus, HFO pulses are terminated at the end of the second occurring switching pulse if a phase relationship of the third type exists.

Assuming that a phase relationship of the fourth type exists, simultaneous switching pulses in all three channels will simultaneously set the memory flip-flops of all three channels. Under these conditions, the resetting of any one flip-flop by means of the respective narrow pulse rejection circuit will not interrupt any one of the three HFO pulses. This is because the flip-flops of the two remaining channels are still set and, therefore, still energizing the majority responsive switching circuit of each channel. Thus, when a phase relationship of the fourth type exists, HFO pulses are terminated, through the respective narrow pulse rejection circuit, at the end of the second occurring switching pulse, assuming that the switching pulses have slightly different durations.

In view of the foregoing, it is apparent that each narrow pulse rejection circuit prevents the termination of HFO pulses in the respective channel unless the duration of those pulses exceeds a predetermined minimum, this minimum duration being determined by the R-C time constants of each narrow pulse rejection circuit.

In the discussion of the first three types of phase relationships no mention was made of the effect of the third occurring switching pulse. This is because the third switching pulse is forced to occur at a time when it cannot set its respective memory flip-flop and, therefore, cannot affect any of the majority responsive switching circuits. It will be recalled that as an HFO pulse occurs, the unijunction oscillators of all channels are force fired through their respective synchronizing circuits. Consequently, when the third occurring switching pulse is forced to occur the signal appearing on one input of gate 18 (HFO) is already low. As a result, the output of gate 18 remains high and the memory flip-flop of that channel is not set. Thus, the last occurring switching pulse has no affect upon the initiation or termination of HFO pulses if phase relationships of the first three types exist.

As described previously, the memory flip-flop of the channel which terminates the HFO pulses is reset at the end of the switching pulse of that channel, this occurring through the respective narrow pulse rejection circuit. Additionally, the memory flip-flop of the channel which produces the last occurring switching pulse requires no resetting because it was prevented from being set. The flip-flop of the remaining channel is reset when all HFO pulses terminate. This is accomplished in pulse generating circuit 10-1, for example, by gate 36, the output of which is connected to the toggle input of flip-flop 19 and the input of which is connected to terminal 20. It will be seen that when flip-flop 19 is set, reset inputs $R_1$ and $R_2$ thereof are both high. As a result, at the end of the HFO pulse when the input to gate 36 goes high, a high-to-low transition occurs at the output of gate 36. This transition resets memory flip-flop 19 via its toggle input.

From the foregoing it will be seen that the memory flip-flops of all channels assume their original, reset states after all HFO pulses have terminated. The manner in which a particular flip-flop is reset depends, of course, upon the role which that flip-flop played in the production of the HFO pulses.

With proper adjustment of the oscillators of the three channels, phase relationships of the first three types can be eliminated shortly after the circuitry is first energized. This is because, after the first set of HFO pulses is produced, the synchronizing effect which the latter pulses produce can be made to cause the switching pulses of the difference channels to occur substantially simultaneously. Phase relationships of the fourth type can be produced by synchronizing all oscillator circuits to a master synchronizing pulse generating circuit. A synchronizing circuit suitable for accomplishing this is disclosed in the copending application of Paul E. Rolfes and Robert S. Jamieson, Ser. No. 8,875, entitled Oscillator Synchronization.

In view of the foregoing, it is apparent that first pulse generating circuits 10-1, 10-2 and 10-3 provide three synchronized trains of output pulses of predetermined duration. It is further apparent that a failure in any pulse generating circuit to the left of the respective majority responsive switching circuit does not interrupt the provision of HFO pulses from that channel. As will be shown presently, even the failure of a majority gate circuit does not interrupt the thyristor firing signals produced by the circuit of FIGS. 1, 2 and 3 taken together.

As mentioned previously, second pulse generating circuits 11-1, 11-2 and 11-3 operate in the same manner as first pulse generating circuits 10-1, 10-2 and 10-3, respectively. The frequency of the pulses included within signals LFO1, LFO2 and LFO3 is, however, substantially less than the frequency of the pulses included within signals HFO1, HFO2 and HFO3.

To the end that each HFO signal may bear a predetermined phase relationship to the LFO signal having the same postscript, signals LFO1, LFO2 and LFO3 are transmitted to pulse generating circuits 10-1, 10-2 and 10-3 through conductors 47-1, 47-2 and 47-3, respectively. Each LFO pulse serves to suppress the generation of HFO pulses in the respective first pulse generating circuit and at the same time force fire the unijunction oscillator therein. In this manner no HFO pulses are produced during a predetermined period following the occurrence of each LFO pulse.

In pulse generating circuit 10-1, for example, the appearance of an LFO1 pulse on conductor 47-1 renders low one input of gate 31 thus causing the output thereof to go high. As the output of gate 31 goes high unijunction transistor 12 is forced to fire and thereby initiate a switching pulse. This is accomplished through transistor 28 in a manner previously described. At the same time this LFO1 pulse energizes a pulse extender circuit 48 through a conductor 49. This circuit produces a low signal of predetermined duration on conductor 17c each time an LFO1 pulse occurs. As a result, pulse extender 48 holds one input of gate 18 low during the time that waveshaping circuit 17 is being forced to produce a switching pulse. Since both inputs to gate 18 must be high before this gate can initiate an HFO pulse, it is apparent that HFO pulses cannot occur during or for a predetermined time after the occurrence of LFO pulses. The purpose of maintaining this type of phase relationship between HFO and LFO signals will become apparent from the following description of the circuitry of FIG. 2.

Referring to FIG. 2 there are shown three substantially similar gate signal generating circuits 50-1, 50-2 and 50-3. Gate signal generating circuits 50-1 of channel 1 provides gate signals (GS) GSA1, GSB1, GSC1, GSD1, GSE1 and GSF1 which, through intervening circuitry, contribute to the energization of the gates of respective thyristors in a three phase inverter circuit. Similarly, gate signal generating circuit 50-2 of channel 2 provides six gate signals GSA2, GSB2, GSC2, GSD2, GSE2 and GSF2 and gate signal generating circuit 50-3 of channel 3 provides six gate signals GSA3, GSB3, GSC3, GSD3, GSE3, and GSF3. When the circuit is operating in the manner intended, corresponding signals in the different channels such as, for example, GSA1, GSA2 and GSA3 are in synchronism.

Each gate signal includes a period during which a series of regularly spaced pulses occur followed by an equal period during which no such pulses occur, these periods occurring alternately and severally. The pulses for all six gate signals of each channel are derived from the HFO signal from the respective channel of FIG. 1. The length of the periods during which such pulses occur is controlled in accordance with the LFO signal from the respective channel of FIG. 1. Thus, each gate signal of given channel comprises a modulated pulse train, the parameters of which are controlled in accordance with the timing signals generated in that channel by the circuitry of FIG. 1.

In addition to the above described intrachannel signals, FIG. 2 shows a plurality of interchannel signals such as, for example, comparison signal (CS) CSA1-2. This signal is produced in channel 1 by circuitry bearing the postscript A and is destined for circuitry of the same type in channel 2. Signals of this type allow the circuitry of each channel to compare the state of its circuitry with the corresponding circuitry of other channels. This, in turn, allows each channel to adjust its own activity in accordance with this comparison to produce the agreement between the channels.

Showing the conductors required to connect terminals such as that at which appears interchannel signal CSA1-2 would make FIG. 2 unduly crowded. Accordingly, these conductors have been omitted. It will be understood, however, that interchannel signals from channel 1 such as CSA1-2 and CSA1-3 are to be connected to the gate signal generating circuitry of channels 2 and 3 in the same manner that interchannels signals CSA2-1 and CSA3-1 from channels 2 and 3 are connected to the gate signal generating circuitry of channel 1. Interchannel signals such as CSA2-1 and CSA3-1 are, of course, produced in channels 2 and 3 in the same manner that signals CSA1-2 and CSA1-3 are produced in channel 1.

Each of the gate signal outputs of channel 1 is produced by gating the HFO signal from the same channel of FIG. 1 with one output of one of the flip-flops 51, 52 or 53. A GSA1 pulse, for example, is produced at the output of a gate 54a when HFO1 occurs (that is when the output of an inverting gate 50 is high) during the time that the Q output of flip-flop 51 is high. Because the output of gate 54a goes low only when signal HFO1 goes low during the time when flip-flop 51 is set, it is apparent that GSA1 has the same form as HFO1 except when flip-flop 51 is not set.

Similarly, GSB1, the output of gate 54b has the same form as HFO1 when flip-flop 52 is set and GSC1, the output of gate 54c, has the same form as HFO1 when flip-flop 53 is set. GSD1, GSE1 and GSF1, the outputs of gates 54d, 54e and 54f, respectively, have the same form as HFO1, when flip-flops 51, 52 and 53, respectively, are reset. Because the Q and $\overline{Q}$ outputs of a flip-flop are always in opposite states, it will be seen that signal GSD1 cannot be produced at the same time as signal GSA1. Similarly, signals GSE1 cannot be produced at the same time as signal GSB1 and signal GSF1 cannot be produced at the same time as signal GSC1. This is the desired phase relationship.

To the end that the six gate signal outputs of channel 1 may be utilized to fire the six thyristors of a three phase inverter, flip-flops 51, 52 and 53 are arranged to change states in a predetermined sequence, each change in state occurring in response to an LFO1 pulse. If the initial states of the Q outputs of flip-flops 51, 52 and 53 are arbitrarily assumed to be 000, respectively, the states assumed by these outputs as five consecutive LFO1 pulses occur are 100, 110, 111, 011 and 001, respectively. The sixth LFO1 pulse returns flip-flops 51, 52 and 53 to their original states, the above sequence repeating with each six consecutive LFO1 pulses.

The above described sequence of output states does not depend upon which of the six output states are present when the circuitry is first energized, but is determined solely by the interconnections between the inputs and outputs of the various flip-flops. Because flip-flop circuits of this type are well known to those skilled in the art, the flip-flop interconnections of FIG. 2 will not be described in detail.

In addition to operating in a mode wherein the flip-flop circuitry successively assumes the above-mentioned six states, the flip-flop circuitry can also operate in a mode having two successive states, namely the 101 and 010 states. Operation in this second mode is undesirable. In the event that the circuitry should begin to operate in this second mode, gate 55 will force a return to operation in the desired first mode. This is accomplished by connecting one input of gate 55 to the Q output of flip-flop 53 through a conductor 56, another to the Q output of flip-flop 51 through a conductor 57 and the third to the $\bar{Q}$ output of flip-flop 52 through a conductor 58. As a result, the output of gate 55 will undergo a high-to-low transition when flip-flops 51, 52 and 53 attain the undesired 101 state. This transition will set flip-flop 52 through a conductor 59 to cause the flip-flop circuitry to attain its 111 state. Once forced into the 111 state and, therefore, into the desired mode of operation, corrective circuitry yet to be described causes the flip-flops of this channel to assume states in conformity with the states of the flip-flops of the other channels.

To the end that the flip-flops of channel 1 may have the same operative states as the corresponding flip-flop of channels 2 and 3, majority forcing gates 60a, 60b, 60c, 60d, 60e and 60f are provided. Each of the above gates compares an intrachannel signal which indicates the state of the respective flip-flop of channel 1 with interchannel signals which indicate the states of the corresponding flip-flops of the other channels. Gate 60a, for example, receives an intrachannel signal through conductors 61 and 62 which indicates the state of the Q output of flip-flop 51. Gate 60a also receives two interchannel signals CSA2–1 and CSA3–1 which indicate the states of the Q outputs of the corresponding flip-flops of channels 2 and 3, respectively.

When each flip-flop of channel 1 is in the same state as at least one of the corresponding flip-flops of the other channels, the intrachannel signal applied to each gate such as 60a of channel 1 disagrees with at least one of the intrachannel signals applied thereto. Under these conditions the outputs of gates 60a through 60f of channel 1 remain high thus initiating no corrective activity in channel 1. When, however, the state of any flip-flop of channel 1 is in a state different from that of the corresponding flip-flops of both other channels (disagrees with the majority) the intrachannel signal produced by the disagreeing flip-flop will agree with the interchannel signals produced by the flip-flops of the other channels. Under these conditions, the output of the gate associated with the disagreeing flip-flop will undergo a high-to-low transition thus initiating a change in the state of the disagreeing flip-flop. This brings the disagreeing flip-flop into conformity with the flip-flops of the other channels. It will be understood, of course, that the same activity occurs in all three channels simultaneously.

Referring to the circuitry of channel 1, it will be seen that the intrachannel signal applied to gate 60a through conductors 61 and 62 has the same state as the Q output of flip-flop 51. It will further be seen that the interchannel signals, CSA1–2 and CSA1–3, produced by channel 1, have a state opposite to that present at the Q output of flip-flop 51, this state reversal being due to the action of inverting gates 63a and 64a.

Thus, the intrachannel and interchannel signals of the same type have different logical states.

This difference is introduced so that the outputs of gates such as 60a do not change states as long as there exists a disagreement between the states of the interchannel and intrachannel signals applied thereto, this disagreement being an indication that there exists an agreement between the flip-flops being compared. This difference is also introduced so that the outputs of gates such as 60a do change states when an agreement between the interchannel and intrachannel signals establishes that a disagreement exists between the flip-flops being compared.

An important feature of the above described corrective circuitry is that it changes the state of a flip-flop only when that flip-flop disagrees with a majority of the flip-flops of the same type. Assume, for example, that the Q output of flip-flop 51 and those of the corresponding flip-flops in channels 2 and 3 are all to be low and the Q output of flip-flop 51 is, in fact, high. Under these conditions, the intrachannel signal produced by flip-flop 51 will be high while the interchannel signals produced thereby will be low. The intrachannel and interchannel signals produced by the corresponding flip-flops of the other channels will, on the other hand, be low and high, respectively.

Since the majority forcing gate of channel 3 receives a low interchannel signal from channel 1 and a high interchannel signal from channel 2, the output thereof stays high to prevent a change of state in the flip-flop in channel 3. Since the majority forcing circuit of channel 2 receives a low interchannel signal from channel 1 and a high interchannel signal from channel 3, the output thereof also remains high to prevent a change in the state of the flip-flop of channel 2. Since, however, the majority forcing gate of channel 1 receives high interchannel signals from channels 2 and 3 and a high intrachannel signal from flip-flop 51, the output thereof goes low to reset the flip-flop of channel 1. Thus, only the disagreeing flip-flop is changed in state. It will be understood, of course, that the same corrective process would occur if the disagreeing flip-flop were in channel 2 or channel 3.

In view of the foregoing, it is apparent that the above described majority forcing circuitry causes corresponding flip-flops in different channels to assume the same output conditions. In this manner each flip-flop in each channel may continue to provide the required succession of output states despite the absence of those (LFO) pulses which normally change the states of the flip-flops of that channel. This prevents the failure of that portion of a channel which is in FIG. 1 from interfering with the operation of that portion of a channel in FIG. 2. This contributes to the high reliability of the circuitry of the invention.

To the end that the above described majority forcing activity may be prevented from occurring during that period when flip-flops 51, 52 and 53 are changing states, there is provided a pulse extender circuit 65. The output of this circuit goes low when signal LFO1 occurs and remains low for a predetermined time thereafter. Conductors 66, 67 and 68 connect the output of pulse extender 65 in disabling relationship to each majority forcing gate. Since LFO1 initiates changes of state in flip-flops 51, 52 and 53, and since LFO1 also initiates a disabling output from pulse extender 65, it is apparent the majority forcing circuitry cannot interfere with the desired changes of state in flip-flops 51, 52 and 53.

In view of the foregoing, it will be seen that the circuitry of FIGS. 1 and 2 provides three sets of gating signals GSA1 through GSF1, GSA2 through GSF2 and GSA3 through GSF3. Each of the six gating signals in each set includes a period during which pulses occur followed by an equal period during which no pulses occur, these periods occurring alternately and severally. As described previously, the periodicity of the above pulses is determined by the periodicity of the HFO pulses from the circuitry of FIG. 1, the periodicity of the above periods is determined by the periodicity of the LFO pulses from the circuitry of FIG. 1, and the phase relationships between the six gating signals is determined by the connections between the outputs of flip-flops 51 through 53 and the inputs of gates 54a through 54f. A circuit of this type is further described in the copending application of Luther C. Butler, Ser. No. 8,875, entitled Majority Logic System.

Figure 3:
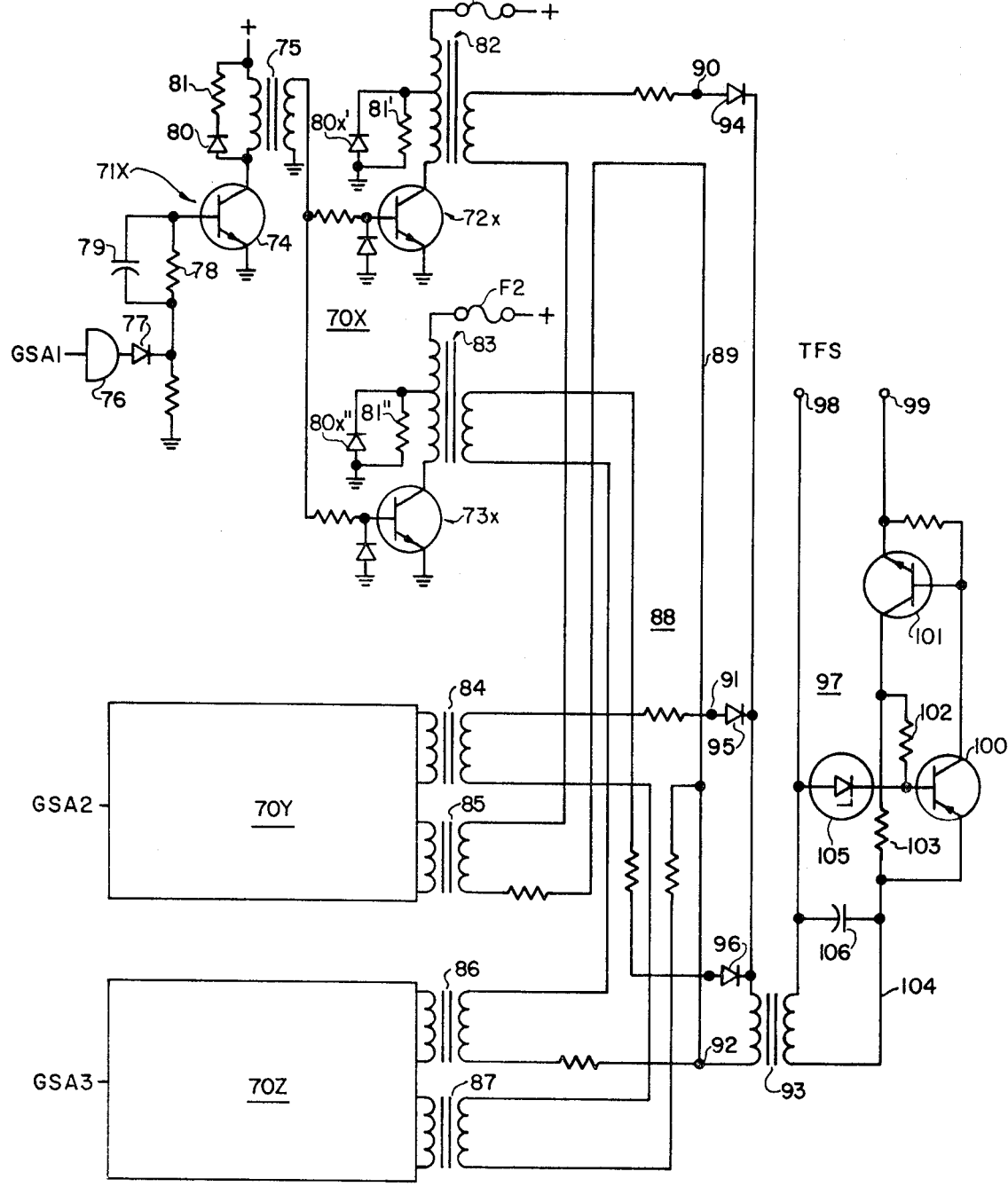
FIG. 3 is a schematic diagram of signal combining circuit means adapted to receive signals from the signal generating circuit means of FIG. 2.

Referring to FIG. 3 there is shown the signal combining circuitry which produces a single thyristor firing signal (TFS) from GSA1, GSA2 and GSA3, the gating signal outputs of channels 1, 2 and 3, respectively. It will be understood that circuits of the type shown in FIG. 3 are required to produce each of the desired thyristor firing signals, each circuit of this type serving to combine, in a highly reliable manner, the corresponding gating signal outputs of each of the three channels described in FIGS. 1 and 2.

To the end that gate signals GSA1, GSA2 and GSA3 may each be split into two substantially similar but amplified gate signals there are provided signal splitting circuits 70x, 70y and 70z, respectively. Each of these circuits includes a preamplifier such as 71x for increasing the strength of the signals applied to the inputs of power amplifiers such as 72x and 73x. The desired split signals appear at the outputs of amplifiers 72x and 73x.

In the present embodiment amplifier 71x includes an NPN transistor 74 having its collector-emitter circuit connected between a source of positive voltage and ground through the primary winding of a transformer 75. When signal GSA1 occurs, the output of a gate 76 goes high. This high initiates a current through a diode 77, a speedup circuit including resistor 78 and capacitor 79 and the base-emitter circuit of transistor 74. Under these conditions, transistor 74 conducts causing a voltage to be induced across the primary and secondary windings of transformer 75, the latter voltage comprising the output of amplifier 71x. Diode 80 and resistor 81 facilitate the resetting of the core of transformer 75 when transistor 74 turns off at the end of the GSA1 pulse.

Amplifiers 72x and 73x operate in a manner similar to that described with reference to amplifier 71x in that pulses appear across the secondary windings of transformers 82 and 83 shortly after each GSA1 pulse energizes amplifier 71x. One difference between amplifier 71x and amplifiers 72x and 73x is that in the former diode 80 and resistor 81 are serially connected across the primary winding of the respective transformer while in the latter the diodes 80x' and 80x'' and resistors 81' and 81'' are connected as parallel networks between ground and a tap of the primary winding of the respective transformer. The connection of the latter networks between ground and the primaries of the latter transformers allows accurate control over the resetting of the cores of these transformers between GSA1 pulses. This, in turn, allows accurate control of the times at which the cores of transformers 82 and 83 will saturate and thereby blow fuses F1 and F2 if a circuit failure should cause GSA1 to remain in its low state for too long a time. In this manner, the detrimental effect of a circuit failure which results in a distorted GSA1 pulse is prevented from disturbing the desired output.

In a similar manner, signal splitting circuit 70y produces pulses across the secondary windings of transformers 84 and 85 when GSA2 occurs and signal splitting circuit 70z produces pulses across the secondary windings of transformers 86 and 87 when GSA3 occurs.

To the end that a failure in any one amplifier circuit may not prevent the generation of thyristor firing signal TFS there is provided a mixing or "OR-ing" circuit 88. This circuit produces three composite signals, each of which is the sum of two signals from different channels, and "OR"s the composite signals to produce a single signal of the desired type. One composite signal, appearing between conductor 89 and junction 90, is the sum of the signal appearing on the secondary winding of transformer 82 of channel 1 and the signal appearing across the secondary winding of transformer 85 of channel 2. Other composite signals, appearing between conductor 89 and junctions 91 and 92, respectively, are the sums of signals from channels 2 and 3 and channels 1 and 3, respectively.

Because the above described composite signals are applied across the primary winding of transformer 93 through diodes 94, 95 and 96, it will be seen that any of the latter signals may produce current in this transformer. Thus, if one of the three composite signals should be interrupted, the remaining composite signals can still energize transformer 93.

If, for example, the signal GSA1 from channel 1 should be interrupted, no pulses will appear on the secondary windings of transformers 82 or 83. Because these pulses no longer add to the pulses appearing on the secondaries of transformers 85 and 86 respectively, the amplitude of the signals appearing between conductor 89 and junctions 90 and 92 will decrease by 50 percent. The absence of these pulses will, however, have no effect upon the amplitude of the composite signal appearing between conductor 89 and junction 91. Under these conditions, the last named signal will energize transformer 93. It is apparent, therefore, that transformer 93 will continue to receive the desired signals whether or not a failure has occurred in the circuitry of channel 1. It will be understood that the same result will occur if the failure should be in the circuitry of channel 2 or 3 instead of that of channel 1. Thus, the failure of any single component or circuit or channel preceding transformer 93 will not interrupt the signal appearing across the secondary for transformer 93.

To the end that thyristor firing signal TFS may be produced only when the gating signals of at least two channels are in phase, there is provided a threshold circuit 97. This circuit will prevent the pulses from transformer 93 from appearing between output terminals 98 and 99 unless the amplitude of these pulses is greater than a predetermined minimum value. In the present embodiment this predetermined value is set at a value greater than that which can be produced across the secondary winding of transformer 93 by any single amplifier such as transformer 72x. It is apparent, therefore, that the above predetermined value can only be exceeded when pulses from different channels add together, that is, when the latter pulses are in phase.

If, for example, the pulses produced at the output of amplifier 71x occur at a time when pulses are not produced at the output of amplifier 73y, the amplitude of the voltage between conductor 89 and junction 90 will not exceed the amplitude of either of the above pulses. Under these conditions, the voltage between conductor 89 and junction 90, cannot produce, across the secondary of transformer 93, the voltage necessary to cause a TFS pulse to appear between terminals 98 and 99. If, however, the pulses produced by amplifiers 71x and 73y occur simultaneously, that is, in phase, the voltage between conductor 89 and junction 90 will have an amplitude equal to the sum of the amplitudes of the above pulses. Under these conditions the voltage between conductor 89 and junction 90 can produce, across the secondary of transformer 93, the voltage necessary to cause a TFS pulse to appear between terminals 98 and 99.

To the end that this may be accomplished, threshold circuit 97 includes first and second controllable conducting means 100 and 101 which here takes the form of PNP and NPN transistors. Because the collector of transistor 101 is connected to the base of transistor 100 (through a resistor 102) an increase in the conduction of transistor 101 causes an increase in the base-emitter current of transistor 100. Similarly, because the collector of transistor 100 is connected to the base of transistor 101, an increase in the conduction of transistor 100 causes an increase in the base-emitter current of transistor 101. It will be seen, therefore, that if conduction is initiated in either transistor the conduction of both transistors will increase regeneratively toward saturation. Thus, transistors 100 and 101 comprise a regenerative switch for controlling the flow of current in conductor 104.

In order that the above described regenerative switch may be rendered conducting only when the outputs of two channels are in phase, the base-emitter circuit of transistor 100 is connected across the secondary winding of transformer 93 through a zener or breakdown diode 105. This diode prevents the flow of base-emitter current in transistor 100 when the voltage across the secondary of transformer 93 is insufficient to cause the breakdown thereof. Since the latter voltage will be insufficient only when the components of no composite signal are in phase, it is apparent that the only signals which threshold circuit 97 prevents from appearing between terminals 98 and 99 are those produced in disagreeing channels. A capacitor 106 improves the response of circuit 97 to the fast rise time signals appearing on the primary of transformer 93.

In view of the foregoing, it is apparent that the circuit of FIG. 3 is adapted to produce a thyristor firing signal if the gating signals from any two of the three channels are in agreement (in phase) with each other, notwithstanding the operative state of the remaining channel. It will be seen, therefore, that the production of a thyristor firing signal will continue despite any single circuit failure in any single channel.

From the foregoing description of FIGS. 1, 2 and 3, it is apparent that a thyristor control circuit constructed in accordance with the invention includes a plurality of each type of circuit, each circuit of each type comparing its own performance with the performance of the majority of circuits of the same type and modifying its activity accordance therewith to accomplish the desired function. In this manner a failed circuit may be made to continue to produce its output even though it no longer operates in the manner intended. Thus, the failure of one circuit in a chain of circuits (as, for example, successive circuits in one channel) does not necessarily mean that whole chain of circuits has failed.

The failure of any one pulse generating circuit of FIG. 1, for example, does not interrupt the succession of pulses from the channel in which the failure occurred. Instead pulses are made to appear at the output of that channel by the action of the nonfailed pulse generating circuits, this occuring through the previously described majority responsive switching circuitry.

Similarly, the failure of any one gate signal generating circuit of FIG. 2 does not necessarily interrupt the desired succession of flip-flop states from the channel in which the failure occurred. Instead the flip-flops of that channel are made to assume the proper states by the action of the nonfailed switching circuits, this occurring through the previously described majority forcing activity.

Even if, despite the above described protective circuitry, the gating signal of any one channel should be interrupted, the circuitry of FIG. 3 will provide the desired output as long as the gating signals from the majority of the channels are in agreement, that is, in phase.

Because of the above described features, the circuitry for the invention will not only continue to produce the desired outputs despite any single circuit failure, but will also continue to produce the desired outputs despite the failure of any combination of circuits excluding the failure of corresponding circuits in different channels. Thus, the desired thyristor firing signals will continue despite the failure of the pulse generating circuitry. Of any one channel, the failure of the gate signal generating circuitry of any one channel and the failure of the signal splitting-mixing circuitry of any one channel. In other words, the desired thyristor firing signals will continue as long as the majority of the circuits of each type operate properly.

What is claimed is:

1. In a control signal generating system, in combination, a plurality of timing signal generating means, means in each timing signal generating means for delaying the production of a timing signal thereby until a majority of said plurality of timing signal generating means are ready to produce their respective timing signals, a plurality of signal generating means for providing respective signals in accordance with timing signals from respective timing signal generating means, means in each signal generating means for comparing the signal generating activity of the respective signal generating means with the signal generating activity of other signal generating means and for conforming the former to the latter if the signal generating activity of the respective signal generating means is different from the signal generating activity of the majority of the signal generating means, and means for combining like signals from different signal generating means.

2. In a circuit for producing a plurality of control signals at a plurality of respective outputs, in combination, a plurality of first pulse generating means for providing a series of pulses having a first repetition rate, a plurality of second pulse generating means for providing a series of pulses having a second repetition rate, a plurality of signal generating means for providing a plurality of signals each including periods during which pulses occur separated by periods during which no pulses occur, means for connecting each first pulse generating means in pulse duration controlling relationship to a respective signal generating means, means for connecting each second pulse generating means in period duration controlling relationship to a respective signal generating means, each of said first pulse generating means including majority responsive means for delaying an output from such first pulse generating means until at least one other first pulse generating means is in condition to produce its respective output, each of said second pulse generating means including majority responsive means for delaying an output from such second pulse generating means until at least one other second pulse generating means is in condition to produce its respective output, means for connecting the majority responsive means of each first pulse generating means to at least one other first pulse generating means, means for connecting the majority responsive means of each second pulse generating means to at least one other second pulse generating means, each of said signal generating means including majority forcing means for coordinating the signals produced by the respective signal generating means with the signals produced by a majority of the signal generating means, means for connecting the majority forcing means of each signal generating means to each other signal generating means, means for combining corresponding signals produced by the different signal generating means, means for connecting said signal combining means in energizing relationship to a plurality of outputs.

3. A control signal generating circuit including a plurality of timing signal generating means, each of said timing signal generating means including oscillator means, memory circuit means, majority responsive means, switching means for preventing said oscillator means from energizing said memory circuit means when said majority responsive means is energized, said control signal generating circuit also including means for connecting each majority responsive means to each memory circuit means, each of said majority responsive means being energized when a majority of the memory circuit means connected thereto is energized, a plurality of synchronizing circuit means, means for connecting said synchronizing circuit means between respective majority responsive means and respective oscillator means, each of said synchronizing circuit means being adapted to force the respective oscillator means to assume a known state when the respective majority responsive means attains a predetermined state, means for deenergizing said majority responsive means and said memory circuit means after the energization of said majority responsive means.

4. A control signal generating circuit including a plurality of timing signal generating means, each of said timing signal generating means including oscillator means for producing a series of switching pulses, memory circuit means, majority responsive means, said control signal generating circuit also including means for energizing each memory circuit means when the respective oscillator means produces a switching pulse, means for connecting each of said majority responsive means to each of said memory circuit means, each of said majority responsive means being energized when a majority of the memory circuit means connected thereto is energized, a plurality of narrow pulse rejection means, means for connecting each narrow pulse rejection means between the respective oscillator means and the respective memory circuit means, said narrow pulse rejection means being adapted to deenergize the respective memory circuit means when the lapse of time between the energization of the respective majority responsive means and the end of the switching pulse from the respective oscillator means exceeds a predetermined minimum, means for deenergizing said majority responsive means and said memory circuit means after the energization of said majority responsive means.

5. A control signal generating circuit as set forth in claim 4 wherein each of said narrow pulse rejection means includes first and second switch means and a timing circuit, means for connecting said first switch means in charge-discharge control relationship to said timing circuit, said first switch means being adapted to allow said timing circuit to discharge during the time after the energization of the respective majority responsive means and before the end of the switching pulse from the respective oscillator means, means for connecting said second switch means between the respective timing circuit and the respective memory circuit means, said second switch means being adapted to deenergize the respective memory circuit means if the time during which said timing circuit discharges is sufficiently long to substantially discharge said timing circuit.

6. A control signal generating circuit including a plurality of timing signal generating means, each of said timing signal generating means including oscillator means, memory circuit means, majority responsive means and means for connecting said oscillator means in energizing relationship to said memory circuit means, said control signal generating circuit also including means for connecting each majority responsive means to each memory circuit means, each of said majority responsive means being energized when a majority of said memory circuits connected thereto is energized, means in each pulse generating means for causing the respective oscillator means to assume a predetermined state when the respective majority responsive means is energized, a plurality of narrow pulse rejection means, means for connecting each narrow pulse rejection means in deenergizing relationship to the respective memory circuit means when the time between the energization of the respective majority responsive means and the end of the switching pulse from the respective oscillator means exceeds a predetermined minimum and means for deenergizing said majority responsive means and said memory circuit means at the end of one of said switching pulses.

7. A control signal generating circuit including a plurality of timing signal generating means, each of said timing signal generating means including oscillator means for producing a series of switching pulses, memory circuit means, majority responsive means, means for energizing said memory circuit means when said oscillator means produces a switching pulse, said control signal generating circuit also including means for connecting each majority responsive means to each memory circuit means, each majority responsive means being adapted to delay the production of a timing signal from the respective timing signal generating means until a majority of the memory circuit means connected thereto is energized, a plurality of synchronizing circuit means, means for connecting each synchronizing circuit means between the respective majority responsive means and the respective oscillator means, each of said synchronizing circuit means being adapted to force the respective oscillator means to produce a switching pulse when the respective majority responsive switching means is energized, a plurality of narrow pulse rejection means, means for connecting each narrow pulse rejection means in deenergizing relationship to the respective memory circuit means, said narrow pulse rejection means being adapted to deenergize the respective memory circuit means if the time lapse between the production of a timing signal by the respective majority responsive means and the end of the switching pulse from the respective oscillator means exceeds a predetermined minimum and means for deenergizing said majority responsive means and said memory circuit means after the energization of said majority responsive means.

8. A control signal generating circuit including a plurality of timing signal generating means and a plurality of gate signal generating means, each of said gate signal generating means including a counter circuit having a plurality of outputs, the states of the outputs of said counter circuit being controlled in accordance with timing signals from a respective one of said timing signal generating means, a plurality of of different gate signal generating means, each majority forcing means being adapted to change the state of the respective bistable switching means if that switching means is in a state which differs from the states of the corresponding bistable switching means in the remaining gate signal generating means and means for disabling said majority forcing means while the states of said bistable switching means are changing.

9. A control signal generating circuit as set forth in claim 8 including a plurality of amplifier means each having at least two output means, means for connecting said amplifier means in signal responsive relationship to the output means of respective signal generating means and "OR" circuit means for combining signals of the same type produced by different amplifier means.

10. A control signal generating circuit as set forth in claim 9 including a plurality of threshold means, firing signal output means, means for connecting said threshold means between respective "OR" circuit means and respective firing signal output means, each of said threshold circuit means being adapted to prevent the respective "OR" circuit means from energizing the respective firing signal output means unless the amplitude of the signal produced by the respective "OR" circuit means exceeds the amplitude of signal produced by any one of the respective amplifier switching means, means for connecting said switching means to respective outputs of said counter circuit, gate signal output means, said switching means being adapted to transmit pulses from said respective timing signal generating means to said gate signal output means when respective outputs of said counter circuit attain predetermined states, a plurality of majority forcing means for coordinating the states of corresponding outputs of the counter circuits of different gate signal generating means, means for connecting each majority forcing means to corresponding outputs of the counter circuits of the different gate signal generating means.

11. A control signal generating circuit including a plurality of timing signal generating means and a plurality of gate signal generating means, each gate signal generating means including a counter circuit having a plurality of outputs, the states of the outputs of said counter circuit being controlled in accordance with timing signals from a respective one of said timing signal generating mean, a plurality of switching means, means for connecting said switching means to respective outputs of said counter circuit, gate signal output means, said switching means being adapted to transmit pulses from said respective timing signal generating means to said gate signal output means when respective outputs of said counter circuit attain predetermined states, a plurality of majority forcing means for conforming the states of the outputs of said counter circuit to the states of the outputs of said counter circuit to the states of the outputs of the counter circuits of the remaining gate signal generating means, means for connecting each majority forcing means in state controlling relationship to a respective output of said counter circuit, means for connecting one input of each majority forcing means in state monitoring relationship to a predetermined output of said counter circuit, means for connecting other inputs of each majority forcing means in state monitoring relationship to corresponding outputs of the counter circuits of other gate signal generating means.

12. A control signal generating circuit including a plurality of timing signal generating means and a plurality of gate signal generating means, each gate signal generating means including at least one bistable switching means having a pair of outputs, means for changing the states of each of said bistable switching means in accordance with pulses from a respective one of said timing signal generating means, at least one gating means, means for connecting each gating means in responsive relationship to a respective output of a respective bistable switching means, gate signal output means, means for connecting said gating means in control relationship between said respective timing signal generating means and said gate signal output means, at least one majority forcing means, each majority forcing means having a plurality of inputs, means for connecting each majority forcing means in state controlling relationship to a respective bistable switching means, means for connecting one input of each majority forcing means to one output of the respective bistable switching means, means for connecting other inputs of each majority forcing means to corresponding outputs of corresponding bistable switching means 13. In a circuit for providing a plurality of synchronized trains of pulses, a plurality of oscillator means for producing respective switching pulses, a plurality of memory circuit means, a plurality of majority responsive means, means for energizing each memory circuit means when a respective oscillator means produces a switching pulse and a respective majority responsive means is deenergized, means for connecting each majority responsive means.

14. A circuit as set forth in claim 13 wherein said narrow pulse rejection means includes first and second switch means and a timing circuit, means for connecting said first switch means in charge-discharge control relationship to said timing circuit, said first switch means being adapted to maintain the discharge of said timing circuit during the period after the energization of the respective majority responsive means and before the end of the switching pulse from the respective oscillator means, means for connecting said second switch means in deenergizing relationship to the respective memory circuit means, said second switch means deenergizing the respective memory circuit means if said last named period is sufficiently long to substantially discharge said timing circuit.

15. In a circuit for providing a plurality of synchronized trains of pulses, a plurality of oscillator means for producing switching pulses, a plurality of memory circuit means, a plurality of majority responsive means, means for connecting each of said oscillator means in energizing relationship to a respective memory circuit means, means for connecting each majority responsive means to each memory circuit means, each majority responsive means delaying its output until a majority of the memory circuit means connected thereto is energized, a plurality of synchronizing means, means for connecting each of said synchronizing means between a respective majority responsive means and a respective oscillator means, each of said synchronizing means being adapted to force the respective oscillator means to assume a predetermined state when the respective majority responsive means produces an output, a plurality of narrow pulse rejection means for deenergizing respective memory circuit means when the time between the production of an output by the respective majority responsive means and the end of the switching pulse from the respective oscillator means exceeds a predetermined minimum, means for connecting said narrow pulse rejection means to respective memory circuit means, means for deenergizing said majority responsive means and said memory circuit means after the energization of said majority means.

16. In a circuit for providing a plurality of synchronized trains of pulses, a plurality of oscillator means for producing respective series of switching pulses, a plurality of memory circuit means, a plurality of majority responsive means, means for energizing each of said memory circuit means when a respective oscillator means produces a switching pulse, means for connecting each majority responsive means to each memory circuit means, each of said majority responsive means producing a respective output when a majority of the memory circuit means connected thereto is energized, a plurality of synchronizing means, means for connecting each synchronizing means between a respective majority responsive means and a respective oscillator means, each of said synchronizing circuit means being adapted to force the respective oscillator means to assume a predetermined state when the respective majority responsive means produces an output, a plurality of narrow pulse rejection means, means for connecting each narrow pulse rejection means in deenergizing relationship to a respective memory circuit means, said narrow pulse rejection being adapted to deenergize the respective memory circuit means if the time lapse between the production of an output by a respective majority responsive means and the end of the switching pulse from a respective oscillator means exceeds a predetermined minimum, means for deenergizing said majority responsive means and said memory circuit means at the end of one of said switching pulses.

* * * * *

UNITED STATES PATENT OFFICE
CERTIFICATE OF CORRECTION

Patent No. 3,619,661　　　　　　　　　Dated　November 9, 1971

Inventor(s)　　Luether C. Butler, Jr., et al.

It is certified that error appears in the above-identified patent and that said Letters Patent are hereby corrected as shown below:

Column 1, line 28, "of" should read -- be --. Column 2, line 6, cancel "tive unsynchronized oscillator circuits included within respec-"; line 62, after "circuit" insert -- . When a majority of the inputs to each majority responsive switching circuit --. Column 3, line 27, "FIG. 4" should begin a paragraph; line 73, before "conformity" insert -- in --. Column 4, line 50, "Q" should read -- $\bar{Q}$ --. Column 7, line 12, cancel "and", first occurrence; line 31, after "ground" insert -- through --. Column 15, line 56, ". Of" should read -- of --. Column 18, line 48, claim 11, "mean" should read -- means --. in addition, in column 18, line 30, after "amplifier" insert -- means, --; lines 57 and 58, cancel "of said counter circuit to the states of the outputs". Claims 8, 12 and 13, should read as shown below:

8. A control signal generating circuit including a plurality of timing signal generating means and a plurality of gate signal generating means, each of said gate signal generating means including a counter circuit having a plurality of outputs, the states of the outputs of said counter circuit being controlled in accordance with timing signals from a respective one of said timing signal generating means, a plurality of switching means, means for connecting said switching means to respective outputs of said counter circuit, gate signal output means, said switching means being adapted to transmit pulses from said respective timing signal generating means to said gate signal output means when respective outputs of said counter circuit attain predetermined states, a plurality of majority forcing means for coordinating the states of corresponding outputs of the counter circuits of different gate signal generating means, means for connecting each majority forcing means to corresponding outputs of the counter circuits of the different gate signal generating means.

UNITED STATES PATENT OFFICE
CERTIFICATE OF CORRECTION

Patent No. 3,619,661  Dated November 9, 1971

Inventor(s) Luether C. Butler, Jr., et al.   PAGE - 2

It is certified that error appears in the above-identified patent and that said Letters Patent are hereby corrected as shown below:

12. A control signal generating circuit including a plurality of timing signal generating means and a plurality of gate signal generating means, each gate signal generating means including at least one bistable switching means having a pair of outputs, means for changing the states of each of said bistable switching means in accordance with pulses from a respective one of said timing signal generating means, at least one gating means, means for connecting each gating means in responsive relationship to a respective output of a respective bistable switching means, gate signal output means, means for connecting said gating means in control relationship between said respective timing signal generating means and said gate signal output means, at least one majority forcing means, each majority forcing means having a plurality of inputs, means for connecting each majority forcing means in state controlling relationship to a respective bistable switching means, means for connecting one input of each majority forcing means to one output of the respective bistable switching means, means for connecting other inputs of each majority forcing means to corresponding outputs of corresponding bistable switching means of different gate signal generating means, each majority forcing means being adapted to change the state of the respective bistable switching means if that switching means is in a state which differs from the states of the corresponding bistable switching means in the remaining gate signal generating means and means for disabling said majority forcing means while the states of said bistable switching means are changing.

13. In a circuit for providing a plurality of synchronized trains of pulses, a plurality of oscillator means for producing respective switching pulses, a plurality of memory circuit means, a plurality of majority responsive means, means for energizing each memory circuit means when a respective oscillator means produces a switching pulse and a respective majority responsive means is deenergized, means for connecting each majority responsive means

UNITED STATES PATENT OFFICE
CERTIFICATE OF CORRECTION

Patent No. 3,619,661  Dated  November 9, 1971

Inventor(s) Luther C. Butler, Jr., et al.   PAGE - 3

It is certified that error appears in the above-identified patent and that said Letters Patent are hereby corrected as shown below:

to each memory circuit means, each majority responsive means being energized when a majority of the memory circuit means connected thereto is energized, a plurality of narrow pulse rejection means, means for connecting each narrow pulse rejection means in de-energizing relationship to a respective memory circuit means when the time between the energization of a respective majority responsive means and the end of the switching pulse from a respective oscillator means exceeds a predetermined minimum and means for de-energizing said majority responsive means and said memory circuit means after the energization of said majority responsive means.

Signed and sealed this 8th day of August 1972.

(SEAL)
Attest:

EDWARD M. FLETCHER, JR.        ROBERT GOTTSCHALK
Attesting Officer              Commissioner of Patents